United States Patent
Fujito (10) Patent No.: US 9,532,364 B2
(45) Date of Patent: Dec. 27, 2016

(54) BASE STATION AND COMMUNICATION CONTROL METHOD

(75) Inventor: Kyoko Fujito, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 129 days.

(21) Appl. No.: 14/235,054

(22) PCT Filed: Jul. 23, 2012

(86) PCT No.: PCT/JP2012/068620
§ 371 (c)(1),
(2), (4) Date: Jan. 25, 2014

(87) PCT Pub. No.: WO2013/015255
PCT Pub. Date: Jan. 31, 2013

(65) Prior Publication Data
US 2015/0119057 A1    Apr. 30, 2015

(30) Foreign Application Priority Data

Jul. 25, 2011  (JP) ................. 2011-162582

(51) Int. Cl.
*H04W 72/08* (2009.01)
*H04W 72/04* (2009.01)
*H04W 92/20* (2009.01)

(52) U.S. Cl.
CPC ....... *H04W 72/082* (2013.01); *H04W 72/0426* (2013.01); *H04W 92/20* (2013.01)

(58) Field of Classification Search
CPC .. H04W 72/082; H04W 84/045; H04W 72/04; H04W 16/10; H04W 24/02; H04W 72/0406; H04W 16/32; H04W 52/243; H04W 72/042; H04W 28/048; H04W 16/14; H04W 24/10; H04W 48/10; H04W 52/244; H04W 52/42
See application file for complete search history.

(56) References Cited

U.S. PATENT DOCUMENTS

2011/0045856 A1* 2/2011 Feng ............... H04W 72/082
                                              455/501
2011/0117967 A1* 5/2011 Vedantham ........ H04B 7/024
                                              455/561
(Continued)

FOREIGN PATENT DOCUMENTS

| JP | 4621798 B1 | 1/2011 |
|----|------------|--------|
| JP | 2011-166685 A | 8/2011 |
| WO | 2011/004868 A1 | 1/2011 |

OTHER PUBLICATIONS

D. Kimura et al., "Inter-cell interference coordination (ICIC) technology", Fujitsu, Fujitsu Ltd., Jul. 8, 2011, vol. 62, No. 4, pp. 455-460, p. 456, right column, line 21 to p. 457, left column, line 20.

(Continued)

*Primary Examiner* — Anthony Addy
*Assistant Examiner* — Martin Chang
(74) *Attorney, Agent, or Firm* — Studebaker & Brackett PC (57) ABSTRACT

A base station comprises a radio communication unit that uses a radio resource to perform radio communication with a radio terminal; an inter-base station communication unit that performs inter-base station communication with another base station; and a control unit that controls the radio communication unit and the inter-base station communication unit. The inter-base station communication unit comprises a transmission unit that transmits interference control information for controlling interference with the other base station, to the other base station; and a reception unit that receives information indicating a usage of the radio resource in the other base station, from the other base station. The control unit acquires the usage of the radio resource in the radio communication unit and changes a transmission cycle of the interference control information in accordance with at (Continued)

least one of the usage of the radio resource in the radio communication unit and the usage of the radio resource in the other base station.

8 Claims, 6 Drawing Sheets

(56) References Cited

U.S. PATENT DOCUMENTS

| | | | |
|---|---|---|---|
| 2012/0014333 A1* | 1/2012 | Ji | H04L 5/0032 370/329 |
| 2012/0100860 A1* | 4/2012 | Lei | H04W 36/20 455/438 |
| 2012/0108180 A1 | 5/2012 | Shibuya | |
| 2012/0225688 A1 | 9/2012 | Yamazaki | |
| 2012/0329497 A1 | 12/2012 | Yamazaki | |

OTHER PUBLICATIONS

3GPP TS 36.423 V8.8.0 (Dec. 2009), 3rd Generation Partnership Project; Technical Specification Group Radio Access Network; Evolved Universal Terrestrial Radio Access Network (E-UTRAN); X2 application protocol (X2AP) (Release 8), pp. 1-100.
D.Kimura et al., "Inter-cell interference coordination (ICIC) technology", Fujitsu, Fujitsu Ltd., Jul. 8, 2011, vol. 62, No. 4, pp. 455-460, p. 456, right column, line 21 to p. 457, left column, line 20.
International Search Report; PCT/JP2012/068620; Aug. 28, 2012.

* cited by examiner

BASE STATION AND COMMUNICATION CONTROL METHOD

TECHNICAL FIELD

The present invention relates to a base station that transmits interference control information for controlling interference to another base station by inter-base station communication, and relates also to a communication control method.

BACKGROUND ART

As a mobile communication system for achieving high speed communication with high capacity, LTE (Long Term Evolution) and LTE Advanced which is a sophisticated version of the LTE are being standardized in 3GPP (3rd Generation Partnership Project), which is a project aiming to standardize.

In the 3GPP standards, in order to achieve an inter-cell interference coordination (ICIC), a Load Indication procedure is defined in which interference control information for controlling interference is transmitted and received between neighboring base stations.

In the Load Indication procedure, the base station transmits, on an X2 interface set with a neighboring base station (another base station), a Load Information message including the interference control information as an information element (IE). The X2 interface is for achieving inter-base station communication.

The base station that receives the Load Information message performs control for ICIC, for example, control for assigning a physical resource block (PRB) that is a radio resource (a so-called scheduling) or transmission power control, on the basis of the interference control information included in the Load Information message.

In the 3GPP standards, a method for setting a scheduling policy, a method of achieving ICIC, an algorithm, etc., are not defined, and these are specific to a vendor; however, it is expected that the interference control information is regularly notified in order to follow a change in communication environment.

Further, under a circumstance where interference easily occurs between base stations, an increase in effect of ICIC is required by frequently notifying the interference control information. On the other hand, under a circumstance where the interference hardly occurs between base stations, reduction in traffic between base stations is required by not frequently notifying the interference control information.

However, in the current 3GPP standards, there is a problem that the above-described requirements are not satisfied because it is expected that the base station notifies, in a fixed circle, the interference control information.

PRIOR ART DOCUMENT

Patent Document

Patent Document 1: 3GPP technical specification "TS 36.423 V8.8.0"

SUMMARY OF THE INVENTION

A aspect of a base station is summarized as the base station, comprising: a radio communication unit that uses a radio resource to perform radio communication with a radio terminal; an inter-base station communication unit that performs inter-base station communication with another base station; and a control unit that controls the radio communication unit and the inter-base station communication unit, wherein the inter-base station communication unit comprises: a transmission unit that transmits interference control information for controlling interference with the other base station, to the other base station; and a reception unit that receives information indicating a usage of the radio resource in the other base station, from the other base station, and the control unit acquires the usage of the radio resource in the radio communication unit and changes a transmission cycle of the interference control information in accordance with at least one of the usage of the radio resource in the radio communication unit and the usage of the radio resource in the other base station.

Another aspect of the base station is summarized in that, in the above-described aspect, the interference control information is information indicating an interference level received by the radio communication unit from a radio terminal connected to the other base station, and the control unit controls: to shorten the transmission cycle of the interference control information in accordance with an increase in usage of the radio resource in the other base station; and to lengthen the transmission cycle of the interference control information in accordance with a decrease in usage of the radio resource in the other base station.

The other aspect of the base station is summarized in that the interference control information is information indicating an interference sensitivity of the radio resource used by the radio communication unit, and the control unit controls: to shorten the transmission cycle of the interference control information in accordance with an increase in usage of the radio resource in the radio communication unit; and to lengthen the transmission cycle of the interference control information in accordance with a decrease in usage of the radio resource in the radio communication unit.

The other aspect of the base station is summarized in that the interference control information is information indicating a transmission power restriction on the radio resource used by the radio communication unit, and the control unit controls: to lengthen the transmission cycle of the interference control information in accordance with an increase in usage of the radio resource in the radio communication unit; and to shorten the transmission cycle of the interference control information in accordance with a decrease in usage of the radio resource in the radio communication unit.

A aspect of a communication control method is summarized as the communication control method in a base station having a radio communication unit that performs radio communication with a radio terminal by using a radio resource, the method comprising: a step of transmitting, to another base station, interference control information for controlling interference with the other base station; a step of receiving, from the other base station, information indicating a usage of the radio resource in the other base station; a step of acquiring the usage of the radio resource in the radio communication unit; and a cycle change step of changing a transmission cycle of the interference control information in accordance with at least one of the usage of the radio resource in the radio communication unit and the usage of the radio resource in the other base station.

Another aspect of the communication control method is summarized in that, in the above-described aspect, the interference control information is information indicating an interference level received by the radio communication unit from a radio terminal connected to the other base station, and the cycle change step comprises: a step of shortening the transmission cycle of the interference control information in accordance with an increase in usage of the radio resource in the other base station; and a step of lengthening the transmission cycle of the interference control information in accordance with a decrease in usage of the radio resource in the other base station.

The other aspect of the communication control method is summarized in that the interference control information is information indicating an interference sensitivity of the radio resource used by the radio communication unit, and the cycle change step comprises: a step of shortening the transmission cycle of the interference control information in accordance with an increase in usage of the radio resource in the radio communication unit; and a step of lengthening the transmission cycle of the interference control information in accordance with a decrease in usage of the radio resource in the radio communication unit.

The other aspect of the communication control method is summarized in that, in the above-described aspect, the interference control information is information indicating a transmission power restriction on the radio resource used by the radio communication unit, and the cycle change step comprises: a step of lengthening the transmission cycle of the interference control information in accordance with an increase in usage of the radio resource in the radio communication unit; and a step of shortening the transmission cycle of the interference control information in accordance with a decrease in usage of the radio resource in the radio communication unit.

DESCRIPTION OF THE EMBODIMENT

A first embodiment through a third embodiment and other embodiments of the present invention are explained with reference to drawings. In the following embodiments, through the drawings, same or similar components are assigned the same or similar reference numerals.

First Embodiment

Configuration of Mobile Communication System

Figure 1:
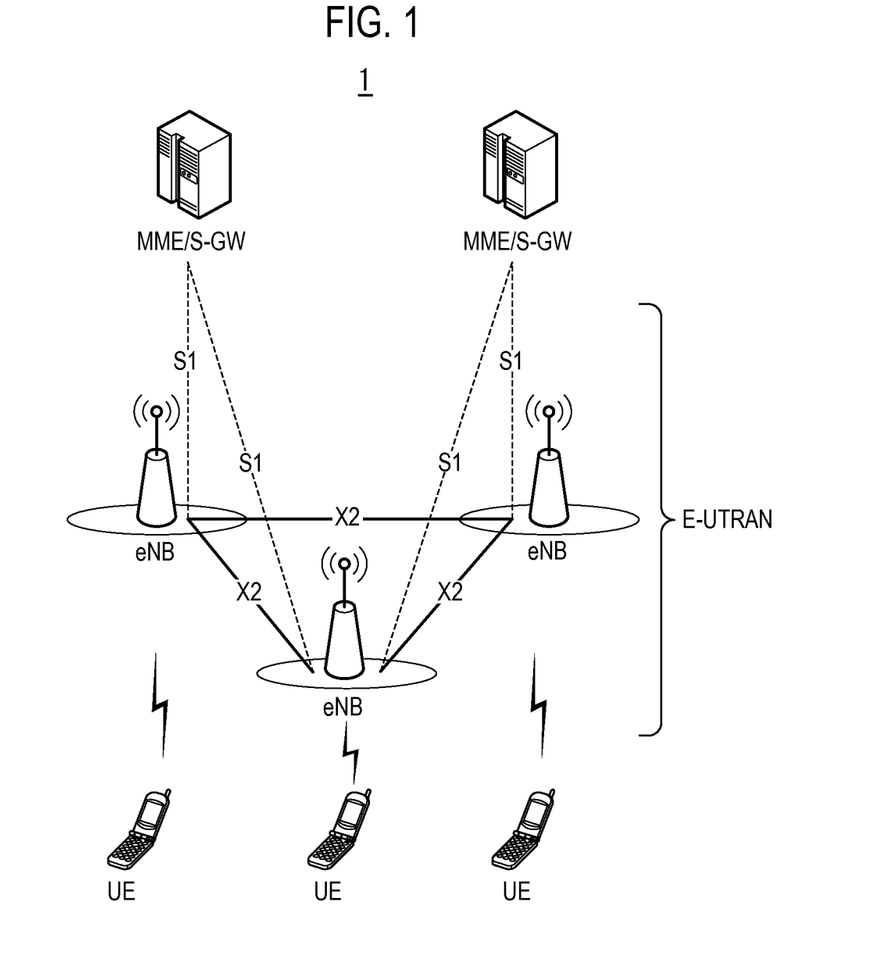
FIG. 1 is a diagram illustrating an entire configuration of a mobile communication system according to first to third embodiments.

FIG. 1 is a diagram showing an entire configuration of a mobile communication system 1 according to the first embodiment. The mobile communication system 1 is con-figured on the basis of LTE (Long Term Evolution) or LTE-Advanced, of which the specifications are stipulated in 3GPP.

As shown in FIG. 1, the mobile communication system 1 includes a plurality of radio terminals UE, a plurality of base stations eNB, a plurality of mobility management entities MME/gateway devices S-GW, and an operation administration and maintenance device OAM.

Each radio terminal UE is a transportable radio communication device belonging to a user. The radio terminal UE is configured to be connected to the base station eNB to enable execution of communication with a communication partner via the base station eNB.

Each base station eNB is a fixed radio communication device set up by an operator, forms one or a plurality of cells, which are a minimum unit of a radio communication area, and is configured to perform radio communication with a radio terminal UE within a cell of the corresponding base station eNB.

Each base station eNB communicates with another base station eNB and communicates with the mobility management entity MME/gateway device S-GW via a backhaul. The plurality of base stations eNB configure E-UTRAN (Evolved-UMTS Terrestrial Radio Access Network) which is a radio access network.

Each of the neighboring base stations eNB is mutually connected by an X2 interface for inter-base station communication. Further, each base station eNB is connected to a mobility management entity MME and a gateway device S-GW by an S1 interface.

The mobility management entity MME is configured to manage an area on which the radio terminal UE camps and to perform various types of mobility managements for the radio terminal UE.

The gateway device S-GW is configured to perform transfer control of user data that is transmitted and received by the radio terminal UE.

In the mobile communication system 1, in the radio communication between the base station eNB and the radio terminal UE, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme, respectively. Further, as a duplex scheme, a FDD (Frequency Division Duplex) scheme or a TDD (Time Division Duplex) scheme is applied.

Figure 2:
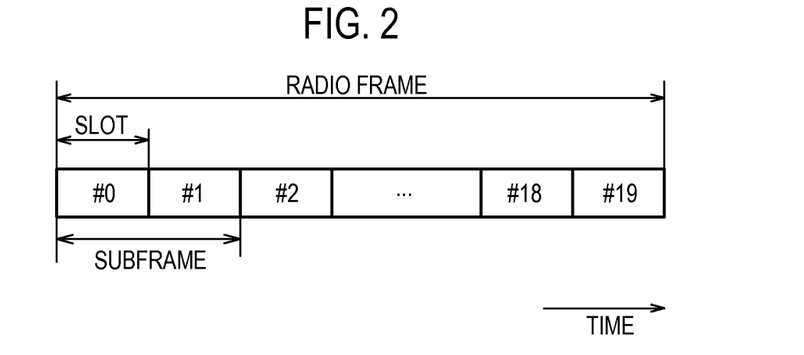
FIG. 2 is a frame configuration diagram applied to the mobile communication system according to the first to third embodiments.

FIG. 2 is a frame configuration diagram applied to the mobile communication system 1. As shown in FIG. 2, a radio frame is configured by 10 subframes while each subframe is configured by two slots. Further, each slot includes a plurality of OFDM symbols in a time axis direction (time domain) and includes a plurality of physical resource blocks (PRBs) in a frequency axis direction (frequency domain). Each PRB includes 12 subcarriers.

(Configuration of Base Station)

Figure 3:
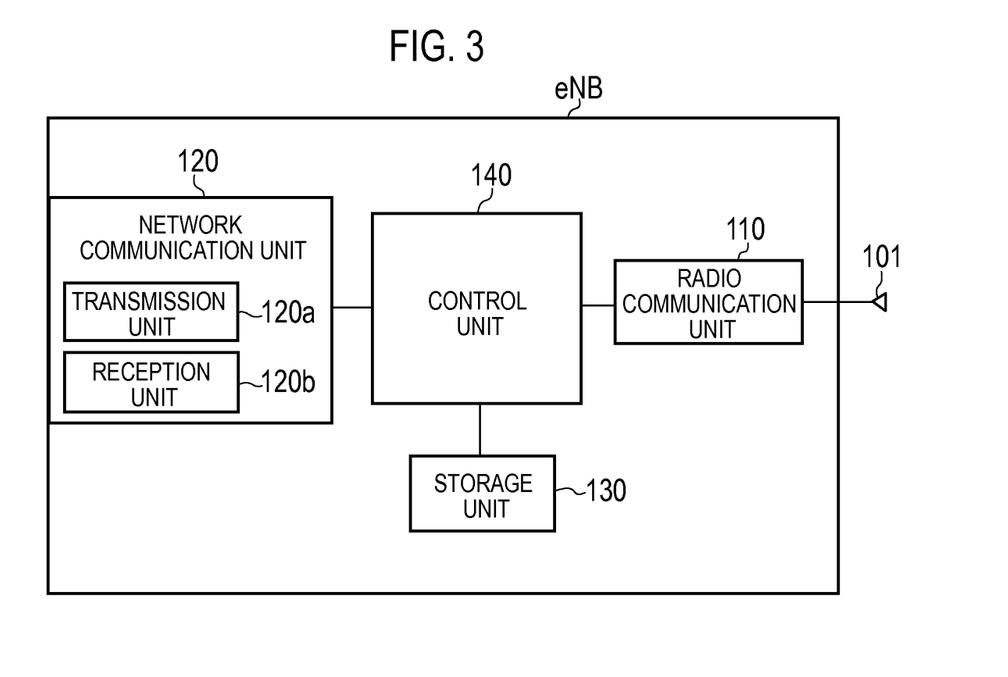
FIG. 3 is a block diagram of a base station according to the first to third embodiments.

Next, the configuration of the base station eNB will be described. FIG. 3 is a block diagram of the base station eNB.

As shown in FIG. 3, the base station eNB includes an antenna 101, a radio communication unit 110, a network communication unit 120, a storage unit 130, and a control unit 140.

The antenna 101 is used for transmitting and receiving a radio signal. The radio communication unit 110 is configured to perform radio communication by using the PRB, via the antenna 101. For transmission, the radio communication unit 110 performs up-conversion, amplification, etc., on a baseband signal input from the control unit 140, and outputs a radio signal from the antenna 101. For reception, the radio communication unit 110 performs amplification, down-conversion, etc. on a received signal input from the antenna 101, and then outputs a baseband signal to the control unit 140.

The network communication unit 120 communicates with the gateway device S-GW and the mobile management entity MME included in a core network by using an S1 interface.

Further, the network communication unit 120 performs communication (inter-base station communication) with one or a plurality of neighboring base stations by using the X2 interface. In the first embodiment, the network communication unit 120 corresponds to an inter-base station communication unit that performs inter-base station communication with another base station.

The network communication unit 120 includes a transmission unit 120a and a reception unit 120b. The transmission unit 120a transmits interference control information for controlling interference with a neighboring base station, to the neighboring base station. In the first embodiment, description is provided mainly on UL Interference Overload Indication (hereinafter, referred to as "OI information"), which is a type of the interference control information items. The reception unit 120b receives radio resource state information indicating a PRB usage (including a concept of a use ratio) in a neighboring base station, from the neighboring base station. The OI information and the radio resource state information will be described in detail later.

The storage unit 130 is configured by using a memory, for example, and stores various types of information items used for control, for example, by the control unit 140. In the first embodiment, the storage unit 130 stores various types of threshold values described later.

The control unit 140 is configured by using, for example, a CPU, and controls various types of functions (the radio communication unit 110, the network communication unit 120, etc.) of the base station eNB. In the first embodiment, the control unit 140 changes a transmission cycle of the OI information that is the interference control information, in accordance with the PRB usage in a neighboring base station indicated by the radio resource state information received by the reception unit 120b of the network communication unit 120 from the neighboring base station.

(Load Indication Procedure)

Next, a Load Indication procedure will be described. In the Load Indication procedure, the interference control information is exchanged between the neighboring base stations eNB in order to achieve ICIC.

Figure 4:
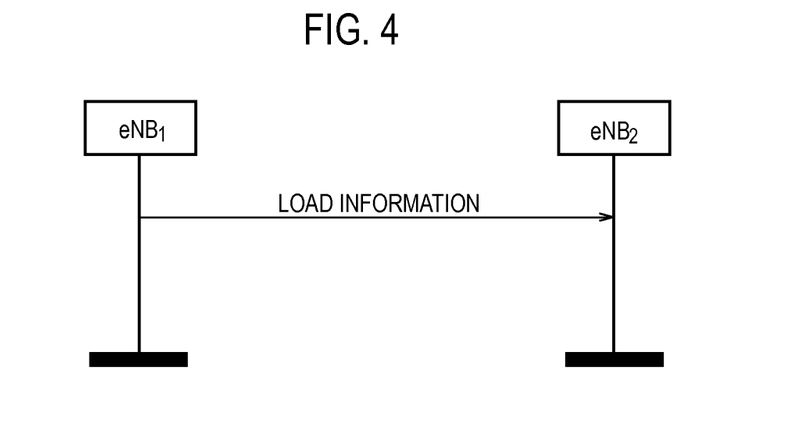
FIG. 4 is a sequence chart of a Load Indication procedure.

FIG. 4 is a sequence chart of the Load Indication procedure. Hereinafter, one of the mutually neighboring base stations eNB is called a base station $eNB_1$ and the other is called a neighboring base station $eNB_2$.

As shown in FIG. 4, the base station $eNB_1$ transmits, to the neighboring base station $eNB_2$, by using the X2 interface, a Load Information message including the interference control information. The neighboring base station $eNB_2$ receives the Load Information message by using the X2 interface.

Table 1 indicates each information element (IE) included in the Load Information message.

TABLE 1

LOAD INFORMATION MESSAGE

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 to maxCellineNB | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 to maxCellineNB | | | | |
| >>>Target Cell ID | M | | ECGI 9.2.14 | Id of the cell for which the HII is meant | — | — |
| >>>UL High Interference Indicators | M | | 9.2.18 | | — | — |
| >>Relative Narrowband Tx Power(RNTP) | O | | 9.2.19 | | — | — |

| Range bound | Explanation |
|---|---|
| maxCellineNB | Maximum no. cells that can be served by an eNB. Value is 256. |

As shown in Table 1, the Load Information message includes, as essential IEs, a message type for identifying a category of the message, a cell ID for identifying a cell of a transmission-source base station of the message, UL High Interference Indication (hereinafter, referred to as "HII information"), and a target cell ID for identifying a cell of a transmission-destination base station of the message.

Further, the Load Information message includes, as optional IEs, the OI information and Relative Narrowband Tx Power (hereinafter, referred to as "RNTP information").

The OI information, the HII information, and the RNTP information each correspond to interference control information. It is noted that the OI information and the HII information are interference control information for controlling an inter-cell interference of an uplink, and the RNTP information is interference control information for controlling an inter-cell interference of a downlink.

(OI Information)

Next, the OI information will be described. The OI information is a type of the interference control information items, and indicates a level of interference received by the radio communication unit 110 from the radio terminal UE connected to the neighboring base station eNB$_2$. The OI information, the OI information is for notifying the interference by the neighboring base station eNB$_2$, and thus, the OI information is reactive interference control information.

(Resource Status Reporting Procedure)

Next, a Resource Status Reporting procedure will be described. In the Resource Status Reporting procedure, various types of resource information items are exchanged between the neighboring base stations eNB, in order to

TABLE 2

UL Interference Overload Indication IE

| IE/Group Name | Presence | Range | IE type and reference | Semantics description |
|---|---|---|---|---|
| UL interference Overload Indication List | | 1 to <maxnoofPRBs> | | |
| >UL Interference Overload Indication | M | | ENUMERATED (high Interference, medium interference, low interference, . . .) | Each PRB is identified by its position in the list: the first element in the list corresponds to PRB 0, the second PRB 1, etc. |

| Range bound | Explanation |
|---|---|
| maxnoofPRBs | Maximum Physical Resource Blocks. Value is 110. |

As shown in Table 2, the OI information is information indicating an interference level for each PRB. It is noted that the OI information is configured to be a list indicating an interference level (for example, a high interference, a medium interference, and a low interference) of an uplink for each PRB, and a position in the list corresponds to a PRB number.

The neighboring base station eNB$_2$ that received the OI information performs scheduling to avoid the PRB receiving a high interference in the base station eNB$_1$. Alternatively, the neighboring base station eNB$_2$ performs transmission power control so as to decrease a transmission power for the PRB receiving a high interference in the base station eNB$_1$. Thereby, an influence of interference received, by a cell-edge terminal connected to the base station eNB$_1$, for example, from the neighboring base station eNB$_2$, in an uplink is decreased.

realize SON (Self Organization Network). For example, an application is envisioned where when a resource of one base station eNB is tight and a resource of the other base station eNB is sufficient, the radio terminal UE connected to the one base station eNB is handed over to the other base station eNB (see 3GPP Technical Report "TR 36.902", for example).

Figure 5:
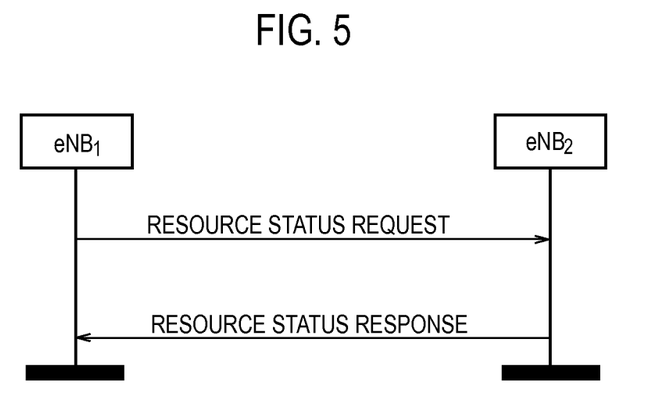
FIG. 5 is a sequence chart of a Resource Status Reporting procedure (part 1).
Figure 6:
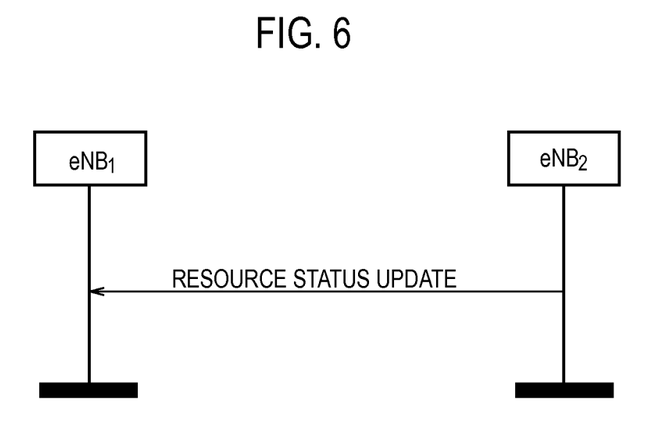
FIG. 6 is a sequence chart of the Resource Status Reporting procedure (part 2).

FIG. 5 and FIG. 6 are sequence charts of the Resource Status Reporting procedure.

As shown in FIG. 5, the base station eNB$_1$ transmits a Resource Status Request message including a transmission request of the resource information to the neighboring base station eNB$_2$, by using the X2 interface. The neighboring base station eNB$_2$ receives the Resource Status Request message by using the X2 interface.

Table 3 shows each IE included in the Resource Status Request message.

TABLE 3

RESOURCE STATUS REQUEST MESSAGE

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 . . . 4095, . . . ) | Allocated by eNB$_1$ | YES | reject |
| eNB2 Measurement ID | O-ifRegistrationRequestStop | | INTEGER (1 . . . 4095, . . . ) | Allocated by eNB$_2$ | YES | ignore |
| Registration Request | M | | ENUMERATED (Start, Stop, . . . ) | In this Release, if the value is set to "stop", the reciever shall stop all cells measurement | YES | reject |
| Report Characteristics | O | | BITSTRING (SIZE(32)) | Each position in the bitmap indicates measurement object the eNB$_2$ is expected to report First Bit = PRB Periodic, Second Bit = TNL load Ind Periodic, Third Bit = HW Load Ind Periodic. Bits 4 to 32 shall be ignored by the eNB$_2$ | YES | reject |

TABLE 3-continued

RESOURCE STATUS REQUEST MESSAGE

| | | | | | | |
|---|---|---|---|---|---|---|
| Cell To Report | | 1 to maxCellineNB | | Cell ID list for which measurement is needed | EACH | ignore |
| >Cell ID | M | | ECGI 9.2.14 | | | |
| Reporting Periodicity | O | | ENUMERATED (1000 ms, 2000 ms, 5000 ms, 10000 ms, . . . ) | | YES | ignore |

Explanation

| | |
|---|---|
| Range bound | |
| maxCellineNB | Maximum no. cells that can be served by an eNB. Value is 256. |
| Condition | |
| ifRegistrationRequestStop | This IE shall be present if the Registration Request IE is set in the value "Stop". |

As shown in Table 3, the Resource Status Request message includes a Report Characteristics IE for designating, to the neighboring base station eNB$_2$, an item to be measured.

"Radio Resource Status" included in the item to be measured is a usage of PRB, which is an assignment unit of a time and frequency resource, "TNL Load Indicator" is a load of backhaul between a base station and a core network, and "HW Load Indicator" is a hardware load of a base station.

In the present embodiment, the base station eNB$_1$ designates the Radio Resource Status (usage of PRB) as an item to be measured, in the Resource Status Request message.

Moreover, the Resource Status Request message is configured so that a cycle in which a measurement result is reported can be designated by Reporting Periodicity IE.

As shown in FIG. 5, the neighboring base station eNB$_2$ transmits a Resource Status Response message which is a positive response to the Resource Status Request message, to the base station eNB$_1$, by using the X2 interface. The base station eNB$_1$ receives the Resource Status Response message by using the X2 interface.

It is noted that the neighboring base station eNB$_2$ transmits a Resource Status Failure message instead of the Resource Status Response message, when it is not possible to receive any item to be measured, which item is designated by the Resource Status Request message.

As shown in FIG. 6, the neighboring base station eNB$_2$ that has transmitted the Resource Status Response message performs measurement in accordance with a condition designated by the Resource Status Request message, and regularly transmits a Resource Status Update message indicating the measurement result to the base station eNB$_1$.

Table 4 shows each IE included in the Resource Status Update message.

TABLE 4

RESOURCE STATUS UPDATE MESSAGE

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 . . . 4095 . . . ) | | YES | reject |
| eNB2 Measurement ID | M | | INTEGER (1 . . . 4095 . . . ) | | YES | reject |
| Cell Measurement Result | | 1 to maxCellineNB | | | EACH | ignore |
| >Cell ID | M | | ECG1 9.2.14 | | | |
| >Hardware Load Indicator | O | | 9.2.14 | | | |
| >S1 TNL Load Indicator | O | | 9.2.15 | | | |
| >Radio Resource Status | O | | 9.2.17 | | | |

| Range bound | Explanation |
|---|---|
| maxCellineNB | Maximum no. cells that can be served by an eNB. Value is 256. |

As shown in Table 4, the Resource Status Update message includes Cell Measurement Result that is a measurement result about a designated cell. The Cell Measurement Result includes a cell ID of a designated cell and designated resource information (Radio Resource Status, TNL Load Indicator, or HW Load Indicator).

In the present embodiment, the base station eNB$_1$ designates the Radio Resource Status as an item to be measured, in the Resource Status Request message, and thus, the Cell Measurement Result includes a Radio Resource Status IE (hereinafter, referred to as "Radio Resource Status information").

(Radio Resource Status Information)

Next, the Radio Resource Status information will be described. Table 5 shows each IE included in the Radio Resource Status information.

TABLE 5

Radio Resource Status IE

| IE/Group Name | Presence | Range | IE type and reference | Semantics description |
|---|---|---|---|---|
| DL GBR PRB usage | M | | INTEGER (0 . . . 100) | |
| UL GBR PRB usage | M | | INTEGER (0 . . . 100) | |
| DL non-GBR PRB usage | M | | INTEGER (0 . . . 100) | |
| UL non-GBR PRB usage | M | | INTEGER (0 . . . 100) | |
| DL Total PRB usage | M | | INTEGER (0 . . . 100) | |
| UL Total PRB usage | M | | INTEGER (0 . . . 100) | |

As shown in Table 5, the Radio Resource Status information includes each IE, that is, a DL GBR PRB usage, a UL GBR PRB usage, a DL non-GBR PRB usage, a UL non-GBR PRB usage, and a Total PRB usage. In this case, "DL" means a downlink, "UL" means an uplink, and "GBR" means a guaranteed bit rate.

(Operation of Base Station According to First Embodiment)

Figure 7:
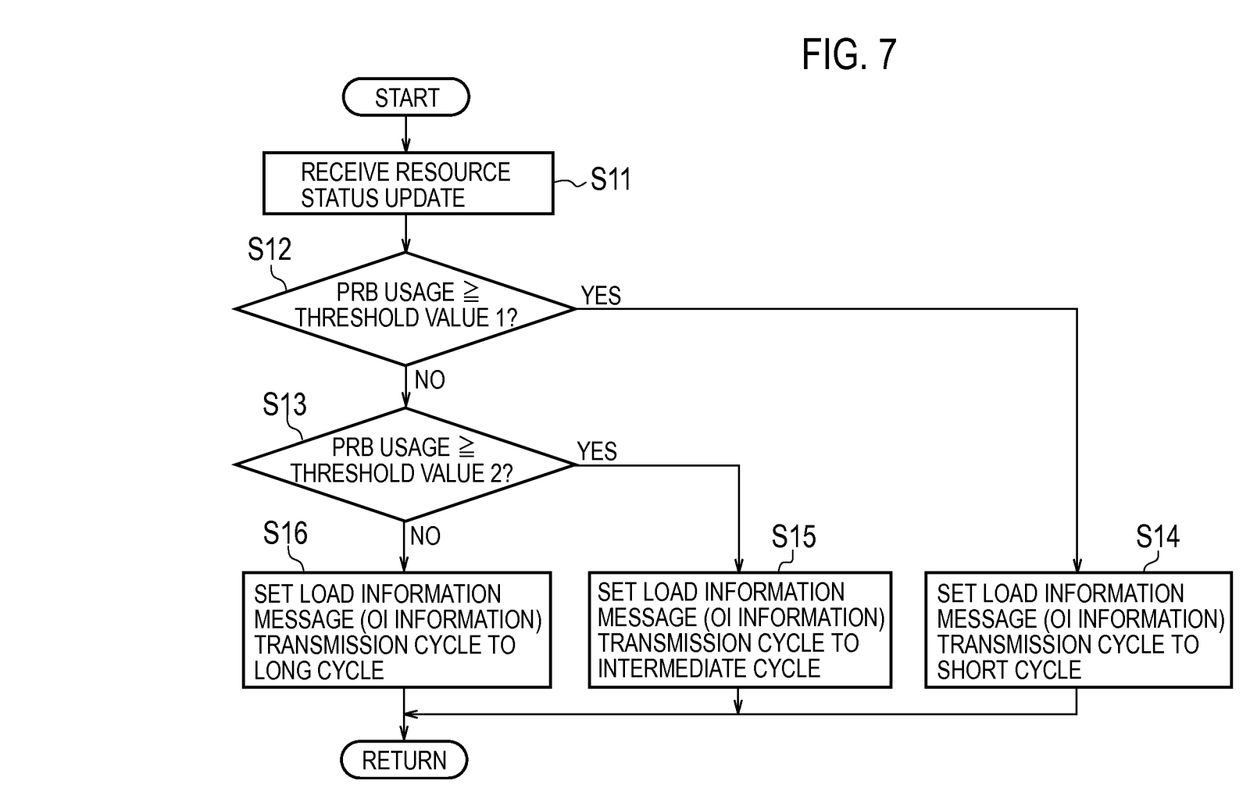
FIG. 7 is an operation flowchart of the base station according to the first embodiment.

Next, an operation of the base station eNB$_1$ according to the first embodiment will be described. FIG. 7 is an operation flowchart of the base station eNB$_1$ according to the first embodiment. It is noted that before the present operation flow, the base station eNB$_1$ is to transmit the Resource Status Request message to the neighboring base station eNB$_2$.

As shown in FIG. 7, in step S11, the reception unit 120b of the network communication unit 120 receives the Resource Status Update message sent from the neighboring base station eNB$_2$, on the X2 interface. The Resource Status Update message includes the Radio Resource Status information.

In step S12, the control unit 140 compares a PRB usage indicated by the Radio Resource Status information received in step S11 with a threshold value 1, advances the process to step S14 when the PRB usage is equal to or more than the threshold value 1, and advances the process to step S13 when the PRB usage is less than the threshold value 1.

In step S13, the control unit 140 compares a PRB usage indicated by the Radio Resource Status information received in step S11 with a threshold value 2, advances the process to step S15 when the PRB usage is equal to or more than the threshold value 2, and advances the process to step S16 when the PRB usage is less than the threshold value 2. It is noted that the threshold value 2 is set to be lower than the threshold value 1.

In step S14, the control unit 140 sets a transmission cycle of the OI information to a short cycle. As a result, the Load Information message including the OI information is transmitted with high frequency.

In step S15, the control unit 140 sets the transmission cycle of the OI information to an intermediate cycle. As a result, the Load Information message including the OI information is transmitted with standard frequency.

In step S16, the control unit 140 sets the transmission cycle of the OI information to a long cycle. As a result, the Load Information message including the OI information is transmitted with low frequency.

(Operation and Effect of First Embodiment)

When the PRB usage in the neighboring base station eNB$_2$ increases, it is expected that the interference level received by the base station eNB$_1$ from the radio terminal UE connected to the neighboring base station eNB$_2$ rises, as a result of which an increase in effect of the ICIC is required.

Thus, when the PRB usage in the neighboring base station eNB$_2$ increases, the base station eNB$_1$ shortens the transmission cycle of the OI information to enable restraining communication quality deterioration that results from the inter-cell interference of the uplink.

On the other hand, when the PRB usage in the neighboring base station eNB$_2$ decreases, it is expected that the interference level received by the base station eNB$_1$ from the radio terminal UE connected to the neighboring base station eNB$_2$ lowers, as a result of which an increase in effect of the ICIC is not required.

Thus, when the PRB usage in the neighboring base station eNB$_2$ increases, the base station eNB$_1$ lengthens the transmission cycle of the OI information to enable reduction of inter-base station traffic between the base station eNB$_1$ and the neighboring base station eNB$_2$.

Second Embodiment

In the second embodiment, the base station eNB$_1$ changes the transmission cycle of the transmission cycle of the HII information. The second embodiment below will be described mainly on a difference from the first embodiment, and duplicated descriptions will be omitted.

(HII Information)

Herein, the HII information will be described. The HII information is a type of the interference control information items, and indicates an interference sensitivity of the PRB used by the base station eNB$_1$. The HII information is for notifying the neighboring base station of the PRB to be assigned to the radio terminal UE located at a cell edge (hereinafter, referred to as "cell-edge terminal"), and thus, is proactive (preceding) interference control information.

TABLE 6

UL High Interference Indication IE

| IE/Group Name | Presence | Range | IE type and reference | Semantics description |
|---|---|---|---|---|
| HII | M | | BIT STRING (1, . . . 110, . . .) | Each position in the bitstrip represents a PRB (first bit- |

TABLE 6-continued

UL High Interference Indication IE

| IE/Group Name | Presence | Range | IE type and reference | Sematics description |
|---|---|---|---|---|
| | | | | PRB 0 and so on), for which value "1" indicates 'high interference sensitivity' and value "0" indicates 'low interference sensitivity'. The maximum number of Physical Resource Blocks is 110 |

As shown in Table 6, the HII information is information indicating whether each PRB of the uplink is high interference sensitivity or low interference sensitivity. For example, the PRB assigned to the cell-edge terminal is susceptible to interference, and hence, high interference sensitivity. On the other hand, the PRB assigned to the radio terminal UE in the vicinity of the base station eNB$_1$ is insusceptible to interference, and hence, low interference sensitivity. The HII information is configured to be a bit string where "1" indicates PRB having a high interference sensitivity and "0" indicates PRB having a low interference sensitivity, and a position of bit is associated with a PRB number.

The neighboring base station eNB$_2$ that received the HII information performs scheduling so as to avoid the PRB having a high interference sensitivity in the base station eNB$_1$. Alternatively, the neighboring base station eNB$_2$ performs transmission power control so as to lower a transmission power for the PRB having a high interference sensitivity in the base station eNB$_1$. Thereby, an influence of interference received, by a cell-edge terminal connected to the base station eNB$_1$, for example, from the neighboring base station eNB$_2$, in an uplink is decreased.

(Operation of Base Station According to Second Embodiment)

Figure 8:
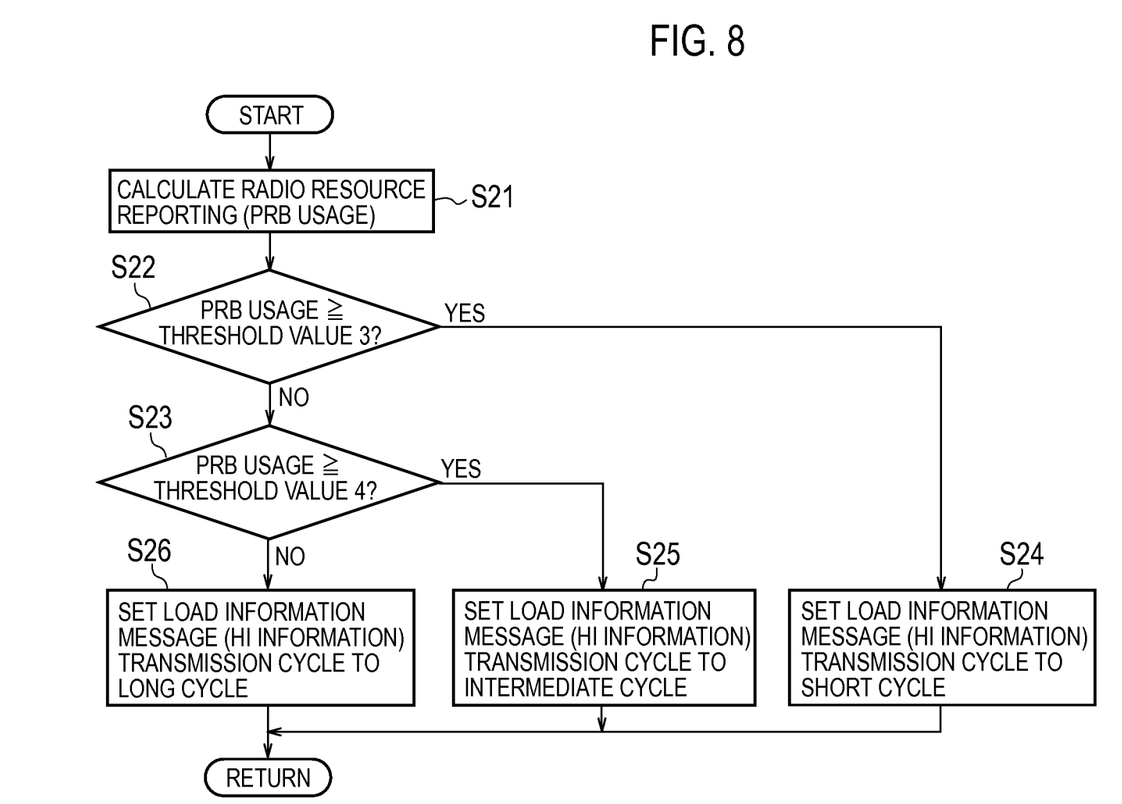
FIG. 8 is an operation flowchart of the base station according to the second embodiment.

Next, an operation of the base station eNB$_1$ according to the second embodiment will be described. FIG. 8 is an operation flowchart of the base station eNB$_1$ according to the second embodiment. The base station eNB$_1$ regularly executes the present operation flow. It is noted that when the base station eNB$_1$ forms a plurality of cells, it may be possible to execute the present operation flow for each cell of the base station eNB$_1$.

As shown in FIG. 8, in step S21, the control unit 140 calculates the PRB usage of the base station eNB$_1$. It is noted that when the Resource Status Request message has been received, the base station eNB$_1$ may transmit, to the base station eNB$_2$, the PRB usage of the base station eNB$_1$, calculated in this step, while including the PRB usage into the Resource Status Update message.

In step S22, the control unit 140 compares the PRB usage of the base station eNB$_1$, calculated in step S21, with a threshold value 3, advances the process to step S24 when the PRB usage is equal to or more than the threshold value 3, and advances the process to step S23 when the PRB usage is less than the threshold value 3.

In step S23, the control unit 140 compares the PRB usage of the base station eNB$_1$, calculated in step S21, with a threshold value 4, advances the process to step S25 when the PRB usage is equal to or more than the threshold value 4, and advances the process to step S26 when the PRB usage is less than the threshold value 4. It is noted that the threshold value 4 is set to be lower than the threshold value 3.

In step S24, the control unit 140 sets a transmission cycle of the HII information to a short cycle. As a result, the Load Information message including the HII information is transmitted with high frequency.

In step S25, the control unit 140 sets a transmission cycle of the HII information to an intermediate cycle. As a result, the Load Information message including the HII information is transmitted with standard frequency.

In step S26, the control unit 140 sets a transmission cycle of the HII information to a long cycle. As a result, the Load Information message including the HII information is transmitted with low frequency.

(Operation and Effect of Second Embodiment)

When the PRB usage in the base station eNB$_1$ increases, the base station eNB$_1$ has no choice but to assign the PRB having a high interference sensitivity (that is, susceptible to interference) as a result of which an increase in effect of the ICIC is demanded.

Thus, when the PRB usage in the base station eNB$_1$ increases, the base station eNB$_1$ shortens the transmission cycle of the HII information to enable restraining of communication quality deterioration that results from the inter-cell interference of the uplink.

On the other hand, when the PRB usage in the base station eNB$_1$ decreases, the base station eNB$_1$ is capable of avoiding assigning the PRB having a high interference sensitivity (that is, susceptible to interference) and an increase in effect of the ICIC is not demanded.

Thus, when the PRB usage in the base station eNB$_1$ decreases, the base station eNB$_1$ lengthens the transmission cycle of the HII information to enable reduction of inter-base station traffic between the base station eNB$_1$ and the neighboring base station eNB$_2$.

Third Embodiment

In the third embodiment, the base station eNB$_1$ changes the transmission cycle of the transmission cycle of the RNTP information. The third embodiment below will be described mainly on a difference from the first embodiment, and duplicated descriptions will be omitted.

(RNTP Information)

Herein, the RNTP information will be described. The RNTP information is a type of the interference control information items, and indicates a transmission power restriction on the PRB used by the base station eNB$_1$. The RNTP information is for notifying the neighboring base station eNB$_2$ that the transmission power is to be decreased, and thus, similarly to HII information, is proactive (preceding) interference control information.

TABLE 7

Relative Narrowband Tx Power (RNTP) IE

| IE/Group Name | Presence | Range | IE Type and reference | Semantics description | Criticality | Assigned Criticality |
|---|---|---|---|---|---|---|
| RNTP Per PRB | M | | BITSTRING (6 . . . 110, . . . ) | Each position in the bitmap represents a less value (i.e. first bit = PRB 0 and so on), for which the bit value reprsents RNTP ($n_{PRB}$), defined in [11]. ■Value 0 indicates "Tx not exceeding RNTP threshold". Value 1 indicates "no promise on the Tx power is given" | — | — |
| RNTP Threshold | M | | ENUMERATED (-co, -11, -10,-9, -8, -7, -6, -5, -4, -3, -2, -1, 0, 1, 2, 3, . . . ) | $RNTP_{threshold}$ is defined in [11] | — | — |
| Number Of Cell-specific Antenna Ports | M | | ENUMERATED (1, 2, 4, . . . ) | P(number of antenna ports for cell-specific reference signals) defined in [10] | — | — |
| P B | M | | INTEGER (0 . . . 3, . . . ) | Pn is defined in [11] | — | — |
| PDCCH Interferance Impact | M | | INTEGER (0 . . . 4, . . . ) | Measured by Predicted Number Of Occupied PDCCH OFDM Symbols (see [10]) Value 0 means "no prediction is available" | — | — |

As shown in Table 7, the RNTP information includes information (RNTP Per PRB) indicating whether the transmission power is restricted to less than an RNTP threshold value for each PRB of the downlink, and information indicating the RNTP threshold value.

The RNTP Per PRB is configured to be a bit string where "0" indicates PRB in which the downlink transmission power is restricted to less than the RNTP threshold value and "1" indicates PRB in which the downlink transmission power is not restricted to less than the RNTP threshold value, and a position of bit is associated with a PRB number.

The neighboring base station $eNB_2$ that received the RNTP information preferentially assigns the PRB in which the downlink transmission power is restricted to less than the RNTP threshold value in the base station $eNB_1$, to the cell-edge terminal connected to the neighboring base station $eNB_2$, for example. Thereby, an influence of interference received, by a cell-edge terminal connected to the neighboring base station $eNB_2$ from the base station $eNB_1$, in a downlink is decreased.

(Operation of Base Station According to Third Embodiment)

Figure 9:
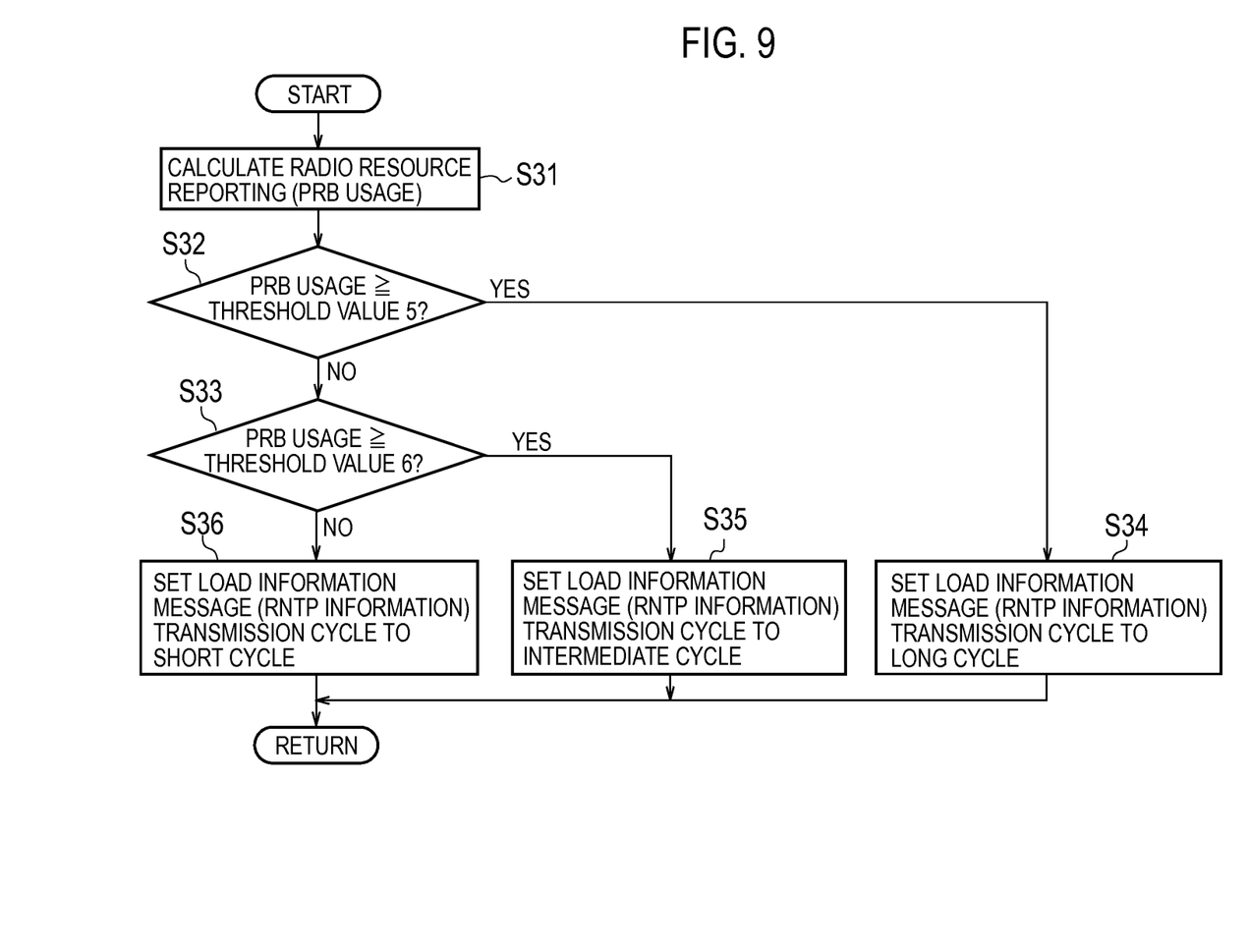
FIG. 9 is an operation flowchart of the base station according to the third embodiment.

Next, an operation of the base station $eNB_1$ according to the third embodiment will be described. FIG. 9 is an operation flowchart of the base station $eNB_1$ according to the third embodiment. The base station $eNB_1$ regularly executes the present operation flow. It is noted that when the base station $eNB_1$ forms a plurality of cells, it may be possible to execute the present operation flow for each cell of the base station $eNB_1$.

As shown in FIG. 9, in step S31, the control unit 140 calculates the PRB usage of the base station $eNB_1$. It is noted that when the Resource Status Request message has been received, the base station $eNB_1$ may transmit, to the base station $eNB_2$, the PRB usage of the base station $eNB_1$, calculated in this step, while including the PRB usage into the Resource Status Update message.

In step S32, the control unit 140 compares the PRB usage of the base station $eNB_1$, calculated in step S31, with a threshold value 5, advances the process to step S34 when the PRB usage is equal to or more than the threshold value 5, and advances the process to step S33 when the PRB usage is less than the threshold value 5.

In step S33, the control unit 140 compares the PRB usage of the base station $eNB_1$, calculated in step S31, with a threshold value 6, advances the process to step S35 when the PRB usage is equal to or more than the threshold value 6, and advances the process to step S36 when the PRB usage is less than the threshold value 6. It is noted that the threshold value 6 is set to be lower than the threshold value 5.

In step S34, the control unit 140 sets a transmission cycle of the RNTP information to a long cycle. As a result, the Load Information message including the RNTP information is transmitted with low frequency.

In step S35, the control unit 140 sets a transmission cycle of the RNTP information to an intermediate cycle. As a result, the Load Information message including the RNTP information is transmitted with standard frequency.

In step S36, the control unit 140 sets a transmission cycle of the RNTP information to a short cycle. As a result, the Load Information message including the RNTP information is transmitted with high frequency.

(Operation and Effect of Third Embodiment)

When the PRB usage in the base station $eNB_1$ increases, the base station $eNB_1$ lengthens the transmission cycle of the RNTP information to enable reduction of inter-base station traffic between the base station $eNB_1$ and the neighboring base station $eNB_2$.

On the other hand, when the PRB usage in the base station $eNB_1$ decreases, the PRB on which transmission power is capable of being restricted increases in number, as a result of which a need for notifying the RNTP information becomes greater.

Thus, when the PRB usage in the base station $eNB_1$ decreases, the base station $eNB_1$ shortens the transmission cycle of the RNTP information to enable restraining of communication quality deterioration that results from the cell interference of the downlink.

Other Embodiments

While the present invention has been described by way of the foregoing embodiments, as described above, it should not be understood that the statements and drawings forming a part of this disclosure limit the invention. From this disclosure, a variety of alternate embodiments, examples, and applicable techniques will become apparent to one skilled in the art.

The aforementioned first embodiment to third embodiment may be performed separately and independently and may also be performed through a combination thereof. For example, the transmission cycles of the OI information, the HII information, and the RNTP information may be collectively changed.

In the above-described first embodiment to third embodiment, the transmission cycle of the interference control information (the OI information, the HII information, or the RNTP information) is gradually changed in accordance with the result of the comparison between the PRB usage and the threshold value. However, in addition to the configuration where the comparison is made with the threshold value, it may be possible that an equation, for calculating the transmission cycle, where the PRB usage is used as a parameter is previously stored, and in accordance with the equation, the transmission cycle of the interference control information (the OI information, the HII information, or the RNTP information) is linearly changed. Further, when the PRB usage is 0 (zero), the Load Information message may not be transmitted.

In the above-described third embodiment, the base station $eNB_1$ lengthens the transmission cycle of the RNTP information when the PRB usage in the base station $eNB_1$ increases and shortens the transmission cycle of the RNTP information when the PRB usage in the base station $eNB_1$ decreases. However, control may be reversely performed. In particular, the base station $eNB_1$ may shorten the transmission cycle of the RNTP information when the PRB usage in the base station $eNB_1$ increases and may lengthen the transmission cycle of the RNTP information when the PRB usage in the base station $eNB_1$ decreases.

Thus, it should be understood that the present invention includes various embodiments that are not described herein.

In addition, the entire content of Japanese Patent Application No. 2011-162582 (filed on Jul. 25, 2011) is incorporated in the present specification by reference.

INDUSTRIAL APPLICABILITY

According to the present invention, it is possible to provide a base station and a communication control method, with which it is possible to appropriately change a transmission cycle of interference control information according to the situation.

The invention claimed is:

1. A base station, comprising:
a radio communication transceiver coupled to an antenna, the radio communication transceiver configured to use a radio resource to perform radio communication with a radio terminal;
a network communication transmitter/receiver configured to perform inter-base station communication with another base station; and
a controller including a processor configured to control the radio communication transceiver and the network communication transmitter/receiver, wherein
the radio communication transceiver and the network communication transmitter/receiver are communicatively coupled to the controller, and wherein
the network communication transmitter/receiver comprises:
a transmitter configured to transmit interference control information for controlling interference with the other base station, to the other base station with a predefined periodicity; and
a receiver configured to receive information indicating a usage of the radio resource in the other base station, from the other base station, and
the controller is configured to acquire the usage of the radio resource in the radio communication transceiver and change the predefined periodicity with which the interference control information is transmitted to the other base station in accordance with at least one of the usage of the radio resource in the radio communication transceiver and the usage of the radio resource in the other base station.

2. The base station according to claim 1, wherein
the interference control information is information indicating an interference level received by the radio communication transceiver from a radio terminal connected to the other base station, and
the controller is configured to control:
to shorten the predefined periodicity in accordance with an increase in usage of the radio resource in the other base station; and
to lengthen the predefined periodicity in accordance with a decrease in usage of the radio resource in the other base station.

3. The base station according to claim 1, wherein
the interference control information is information indicating an interference sensitivity of the radio resource used by the radio communication transceiver, and
the controller is configured to control:
to shorten the predefined periodicity in accordance with an increase in usage of the radio resource in the radio communication transceiver; and
to lengthen the predefined periodicity in accordance with a decrease in usage of the radio resource in the radio communication transceiver.

4. The base station according to claim 1, wherein
the interference control information is information indicating a transmission power restriction on the radio resource used by the radio communication transceiver, and
the controller is configured to control:
to lengthen the predefined periodicity in accordance with an increase in usage of the radio resource in the radio communication transceiver; and
to shorten the predefined periodicity in accordance with a decrease in usage of the radio resource in the radio communication transceiver.

5. A communication control method in a base station having a radio communication transceiver coupled to an antenna, the radio communication transceiver configured to perform radio communication with a radio terminal by using a radio resource, the method comprising:
a step of transmitting, to another base station, interference control information for controlling interference with the other base station, with a predefined periodicity;

a step of receiving, from the other base station, information indicating a usage of the radio resource in the other base station;

a step of acquiring the usage of the radio resource in the radio communication transceiver; and a periodicity change step of changing the predefined periodicity with which the interference control information is transmitted to the other base station in accordance with at least one of the usage of the radio resource in the radio communication transceiver and the usage of the radio resource in the other base station.

6. The communication control method according to claim 5, wherein the interference control information is information indicating an interference level received by the radio communication transceiver from a radio terminal connected to the other base station, and the periodicity change step comprises:

a step of shortening the predefined periodicity in accordance with an increase in usage of the radio resource in the other base station; and a step of lengthening the predefined periodicity in accordance with a decrease in usage of the radio resource in the other base station.

7. The communication control method according to claim 5, wherein the interference control information is information indicating an interference sensitivity of the radio resource used by the radio communication transceiver, and the periodicity change step comprises:

a step of shortening the predefined periodicity in accordance with an increase in usage of the radio resource in the radio communication transceiver; and a step of lengthening the predefined periodicity in accordance with a decrease in usage of the radio resource in the radio communication transceiver.

8. The communication control method according to claim 5, wherein the interference control information is information indicating a transmission power restriction on the radio resource used by the radio communication transceiver, and the periodicity change step comprises:

a step of lengthening the predefined periodicity in accordance with an increase in usage of the radio resource in the radio communication transceiver; and a step of shortening the predefined periodicity in accordance with a decrease in usage of the radio resource in the radio communication transceiver.

* * * * *